March 27, 1951
J. C. ABBOTT
2,546,414
APPARATUS FOR SHELLING SHRIMP
Filed Oct. 29, 1945
2 Sheets—Sheet 2
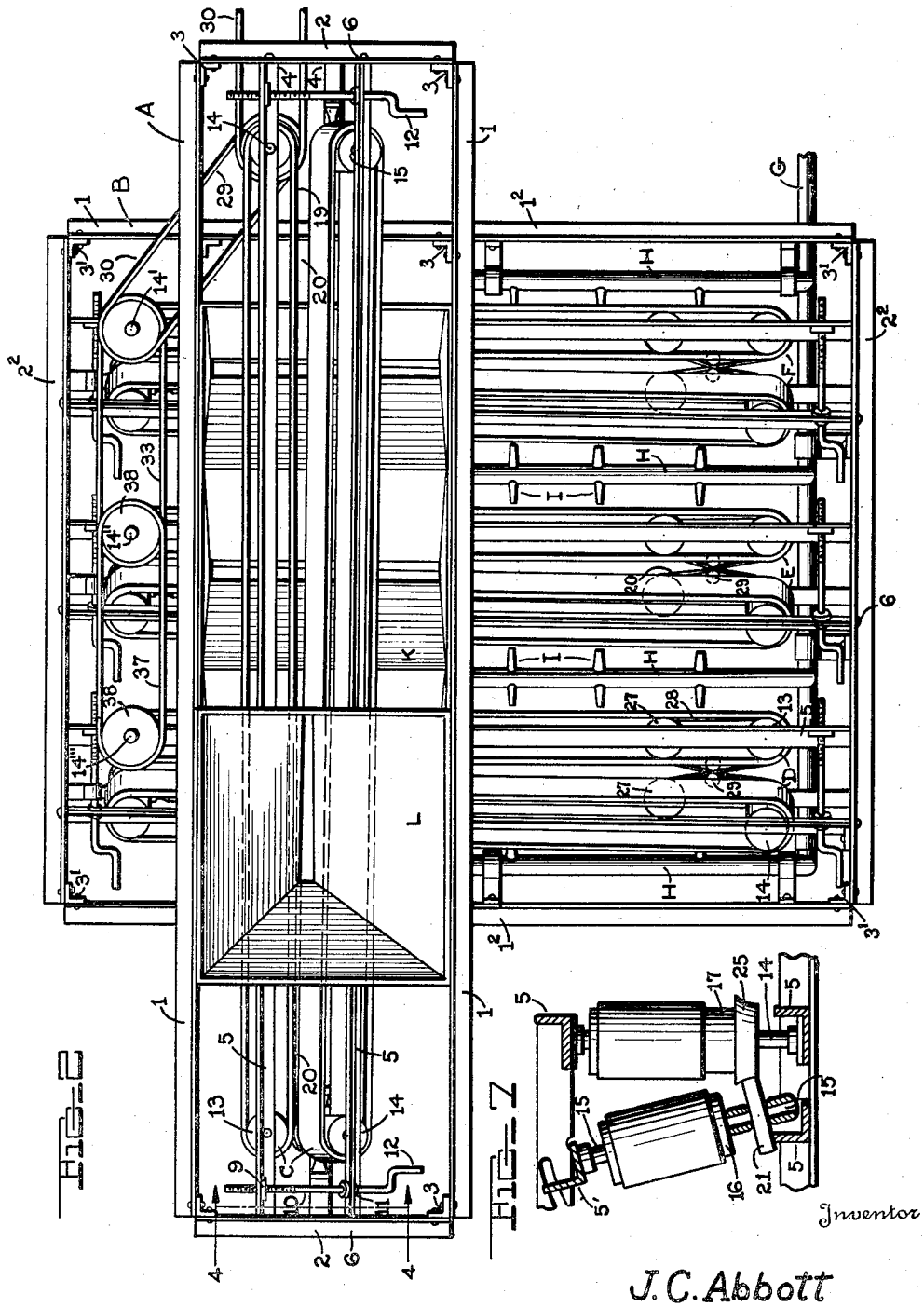
Inventor
J. C. Abbott
By Mason Fenwick Lawrence
Attorneys Patented Mar. 27, 1951

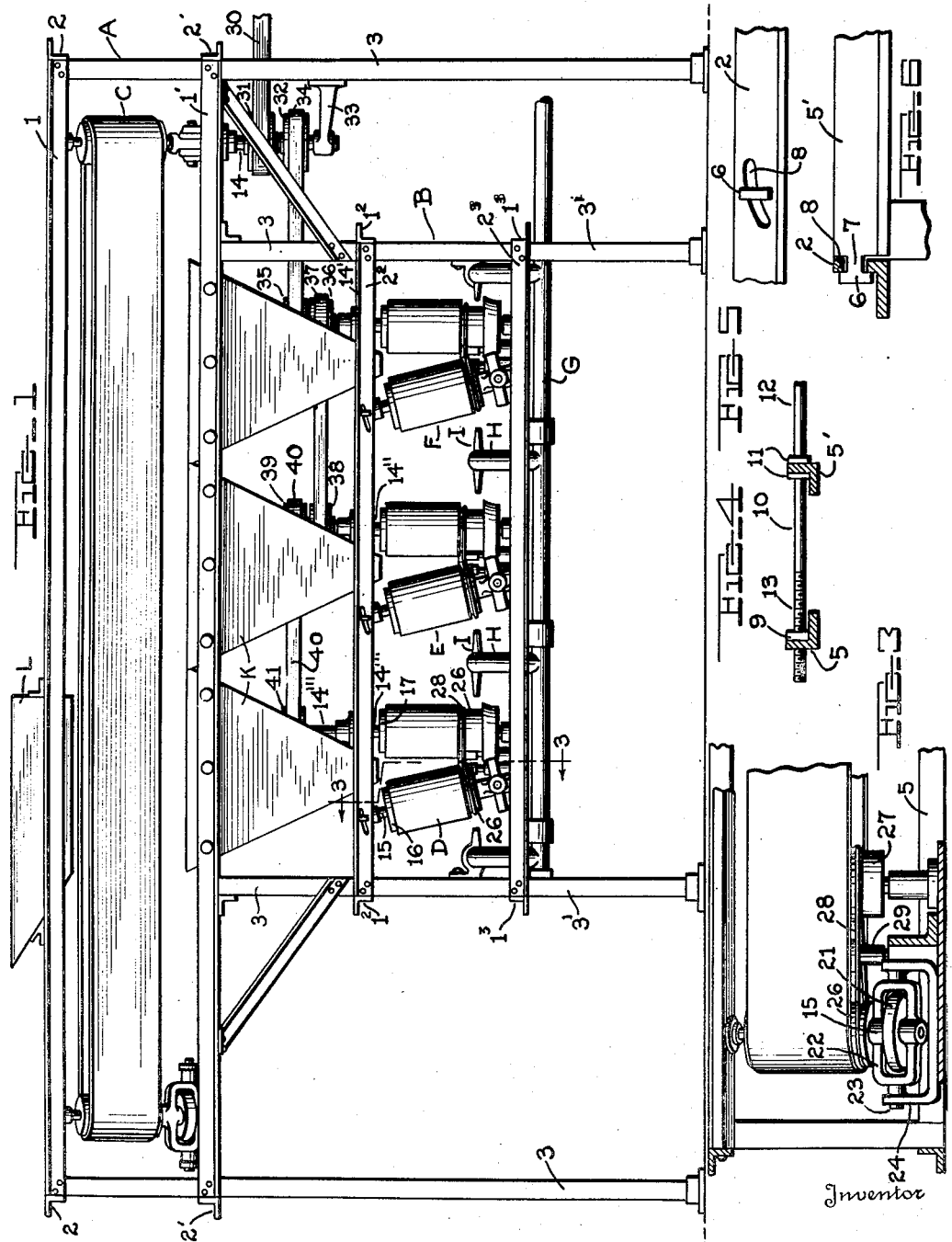

2,546,414

UNITED STATES PATENT OFFICE 2,546,414

APPARATUS FOR SHELLING SHRIMP

James Carl Abbott, Darien, Ga.

Application October 29, 1945, Serial No. 625,262

4 Claims. (Cl. 17—2)

This invention relates to an apparatus for grading and shelling shrimp.

Various machines have been proposed for the commercial shelling of shrimp, which machines rely upon various devices for cutting or sawing the shells of the shrimp in association with various devices for holding the shrimp during such manipulation of the shells.

The present invention is directed to an efficient mechanism for first sorting the shrimp into standard sizes and then suitably holding the shrimp while subjecting the body and tail portions of the shrimp to blasts of a fluid medium under pressure by means of which the shells are broken from the body proper of the shrimp and thereafter separating the heads from the shelled body portions of the shrimp and the efficient separation of the shelled body portions from the severed head portions.

Various particular objects in connection with the apparatus will more particularly appear in the course of the following detailed description.

The invention consists in the novel construction, arrangement and combinations of parts hereinafter more particularly described and claimed.

Two sheets of drawings accompany this specification as part thereof, in which like reference characters indicate like parts throughout.

In the drawings:

Figure 1 is a front elevation of the improved apparatus;

Figure 2 is a plan view of the apparatus;

Figure 3 is a fragmentary cross-section taken on line 3—3 of Figure 1;

Figure 4 is a fragmentary cross-section taken on line 4—4 of Figure 2;

Figure 5 is a fragmentary end view showing the details for connecting the adjustable frame members;

Figure 6 is a fragmentary transverse cross-section taken through the showing of Figure 5; and, Figure 7 is a fragmentary cross-section taken on line 7—7 of Figure 2.

To rapidly and efficiently shell shrimp for commercial purposes it has been found that the direction of blasts of compressed air or steam against the bodies of the shrimp while the shrimp are sustained by the head portions and such blasts are directed from opposite sides of the body of the shrimp produces highly satisfactory results. To enable the commercial application of this discovery a simple and efficient apparatus has been devised by means of which shrimp of assorted size can be efficiently graded into different size groups and the shrimp of each of the size groups efficiently held by the head portions only while the body portions are subjected to the blasts of fluid medium to remove the shell and thereafter the head portions are severed from the shelled body portions so that these portions are separately delivered at suitable points.

The apparatus as diagrammatically illustrated herein comprises in general a framework comprising two substantially rectangular frames A and B, one arranged perpendicularly to and elevated above the other.

Each of these generally rectangular frames includes additional adjustable frame members to support journals for pulleys adapted to carry conveyor belts arranged in pairs, the belts of each pair being angularly disposed with respect to each other so that the space between the two adjacent reaches of each pair of belts constitutes a trough, the side walls of which are formed by the adjacent reaches of the belts and the opening between the bottom edges of these two adjacent reaches increases in width from one end to the other of the belts in the common direction of travel of these two reaches.

One pair of such belts C is supported in the upper frame functioning as a separator and the shrimp are fed to this pair of belts as through a hopper L. Several pairs of these belts are arranged in the lower frame B, these pairs of belts D, E and F extending parallel and arranged to receive shrimp of selected sizes as dropped from the upper belts C through hoppers K.

A header G supplies steam, compressed air or other suitable fluid medium to a plurality of pipes H which extend parallel with the pairs of belts D, E, F, these pipes having nozzles I arranged to direct streams against the suspended bodies of the shrimp from opposite sides.

Referring to the drawings, both of the frame structures A and B are similar. The framework may be conveniently formed of channel bars comprising longitudinal members 1—1 and 1'—1' with transverse end members 2—2 and 2²—2² connecting the same and similarly positioned lower frame members 1²—1² and 1³—1³ positioned immediately below and parallel with the upper frame members. These principal frame members of frame A are connected by vertical leg members 3 while the frame B is supported by legs 3'. The end frame members 2—2' support intermediate longitudinally extending frame members 5—5 and adjustable frame members 5'. Diagonal braces may be provided as necessary to properly stiffen the structure. The braces illustrated in Figure 1 connect end leg 3 and an intermediate leg 3 of frame A and these braces are concealed in Figure 2 by the flange of frame member 1.

The ends of the intermediate members 5—5—5 are fixedly secured with respect to the end frame members 2—2' while the ends of the adjustable frame members 5' are slidably secured as illustrated in detail in Figures 5 and 6, in which it will be noted the end frame members 2 are provided with elongated slots 8 while the ends of the frame members 5' are provided with reduced neck portions 7 and terminal head portions 6 by means of which frame members 5', by being turned, can be inserted through slots 8 and then locked in an adjustable position with respect to the frame members 2.

To adjust the upper frame members 5' with respect to the fixed frame members 5, connecting rods 10 are provided having on one end a crank handle 12 and fitted with spaced flanges 11—11 to prevent longitudinal motion of the rod 10 with respect to the adjustable frame member 5'. The threaded end 13 of rod 10 is threaded through a nut 9 secured to the flange of fixed frame 5.

In the upper frame members 5 and 5', adjacent each end are provided journals for shafts 14 and 15 carrying pulleys 16 and 17, the shafts 14 being positioned vertically while the shafts 15 are inclined to the vertical so that each of the endless belts 19 mounted upon pairs of pulleys 16 and 17 will have their inner reaches inclined with respect to each other to form a longitudinally extending trough. The pulleys 16 and 17 at the inlet end are more closely spaced than those at the outlet end, so that space 20 between the bottom edges of the endless belts 19 of each pair increases in width in the direction of travel of the belts as is well shown in Figure 2.

It is proposed that power be transmitted from one of the endless belts 19 of each pair to the other of said belts, and to accomplish this objective the journals for the lower ends of the inclined shaft 15 are especially constructed as illustrated in Figures 3 and 7. The lower portion of shaft 15 is provided with a friction drive pulley 21 and journaled in a ring-bearing member 22 provided with diametrically disposed outwardly directed pinions 23 mounted in a bracket 24 supported by frame members 5. By means of this construction the friction drive pulley 21 mounted on shaft 15 has its center of oscillation at the same point as its center of rotation so that changing of the angular adjustment of shaft 15 will not effect the frictional engagement of drive pulley 21 with respect to drive pulley 25 mounted on pulley shaft 14. At the same time, pulleys 16 and 17 being positioned on shafts 14 and 15 substantially above the point of oscillation of shaft 15 permits the adjustment of the space 20 between the bottom edges of the belts carried by said pulleys by means of changing the angularity of shaft 15 by means of the adjustment rods 10 which varies the spacing of the upper longitudinal frame members 5—5' carrying the journals for the upper ends of shafts 14 and 15. Preferably, the adjustment rods 10 will be provided at each end of the frame members 5—5' so that the trough-forming endless belts can be adequately adjusted to vary the width of the bottom slot in the trough.

The belts of each of the pairs of belts are similarly mounted and the above description applies to all.

In connection with the lower group of endless belts which operate in the shelling operation, a special deheading device is located adjacent the delivery end of these belts. The device is well illustrated in Figures 2 and 3. For this purpose supplementary pulleys 26 are mounted adjacent the terminal pulleys 25 and 21 and associated with these end pulleys 26 are grooved pulleys 27, which pulleys 26 and 27 carry short, round belts 28 which pass over closely spaced pulleys 29 positioned directly below and medial of the wide end of the bottom opening 20 between each pair of conveyor belts. The adjacent approaching reaches of these belts 28 operate to engage and sever the head portions of the shrimp supported between the conveyor belts from the shelled body portions of the shrimp depending below the belts at this point. The heads are carried on by the conveyor belts beyond the rollers 29 and the shelled portions drop into suitable containers or onto a delivery belt (not herein shown) for removal from the machine.

As herein illustrated the various pairs of conveyor belts, C, D, E and F are driven through pulleys mounted on the vertical shafts 14. Referring to Figure 2, power is supplied to the machine through belt 30 which engages a pulley 31 on the shaft 14 at the right-hand end of group C on which shaft is secured a second pulley 32. The lower end of this shaft 14 may be journaled in a bracket 33 supported from adjacent leg 3. A belt 34 passes over pulley 32 and over a pulley 35 mounted on the upper end of vertical shaft 14' of the right-hand pair of conveyor belts F on which shaft is secured a second pulley 36 from which a belt 37 extends to a pulley 38 on the shaft 14" of group E. A second pulley 39 on that shaft carries a belt 40 which similarly drives pulley 41 on shaft 14''' of group D. As previously described the vertical conveyor belt of each pair drives its associated inclined and adjustable belt.

The shrimp, upon being deposited between the transverse pairs of belts D, E and F from the grading belts C gravitate to project the small tail ends through the bottom spaces 20 and the shrimp gradually gravitates as the space between the belts widens until as they approach the head cut-off point at the rollers 29 all of the body portions of the shrimp are projecting downwardly between the belts, and the shrimp are held solely by the heads. During this passage of the shrimp the downwardly projecting tail and head portions are subjected to repeated blasts of steam or compressed air from nozzles I on opposite sides, effectively removing the shell from such exposed portions of the bodies, and at the cut-off point the shelled body portions will drop while the head portions will be carried beyond the cut-off point and discharged at the outlet end of the work troughs.

Having thus described my invention, I claim:

1. A device for shelling shrimp, comprising two endless belts arranged with adjacent reaches adapted to travel in the same direction, said reaches positioned in planes angularly disposed with respect to each other both longitudinally of said reaches and transversely thereof, whereby said reaches constitute a moving trough with the bottom edges of the sides spaced apart a less distance than the top edges, and said bottom edges inclined apart in the direction of travel of said reaches, with means located adjacent the bottom edges of the parallel pairs for directing opposed blasts of a fluid medium from opposite sides transversely of and below the bottom edges of said belt reaches.

2. A device for shelling shrimp, comprising means for engaging the head part of a shrimp with the body and tail part depending and means operatively associated with said engaging means for directing opposed blasts of a fluid medium from opposite sides against the body and tail part to remove the shell therefrom.

3. A device for shelling shrimp, comprising a plurality of spaced jets for directing fluid under pressure, means associated with said jets for engaging the shrimp by the head part with the body and tail part depending and advancing the shrimp past and through the range of said jets whereby the body and tail parts of the shrimp are successively exposed to blasts of a fluid medium from opposite sides adapted to remove the shell from said parts.

4. A device for shelling shrimp, comprising jets arranged in oppositely disposed pairs for directing opposed blasts of a fluid medium under pressure, means associated with said jets for engaging the shrimp by the head part with the body and tail depending and advancing the shrimp through the fluid blast, with means associated with said engaging means for severing the heads from the bodies of the shrimp after passing through said blast, permitting the bodies to drop separately from the heads.

JAMES CARL ABBOTT.

REFERENCES CITED

The following references are of record in the file of this patent:

UNITED STATES PATENTS

| Number | Name | Date |
|---|---|---|
| 1,313,375 | Frazier | Aug. 19, 1919 |
| 1,427,325 | Quick | Aug. 29, 1922 |
| 1,493,425 | Bergeron et al. | May 6, 1924 |
| 2,034,691 | Bottker et al. | Mar. 24, 1936 |
| 2,102,945 | Doxsee et al. | Dec. 21, 1937 |
| 2,263,694 | Grayson | Nov. 25, 1941 |
| 2,292,068 | Grayson | Aug. 4, 1942 |
| 2,297,411 | Henning | Sept. 29, 1942 |
| 2,429,828 | Lapeyre et al. | Oct. 28, 1947 |